Jan. 31, 1961
C. J. TROJAHN
2,969,937
AIRCRAFT ROTOR DRIVING MEANS
Filed Dec. 31, 1957
2 Sheets-Sheet 1
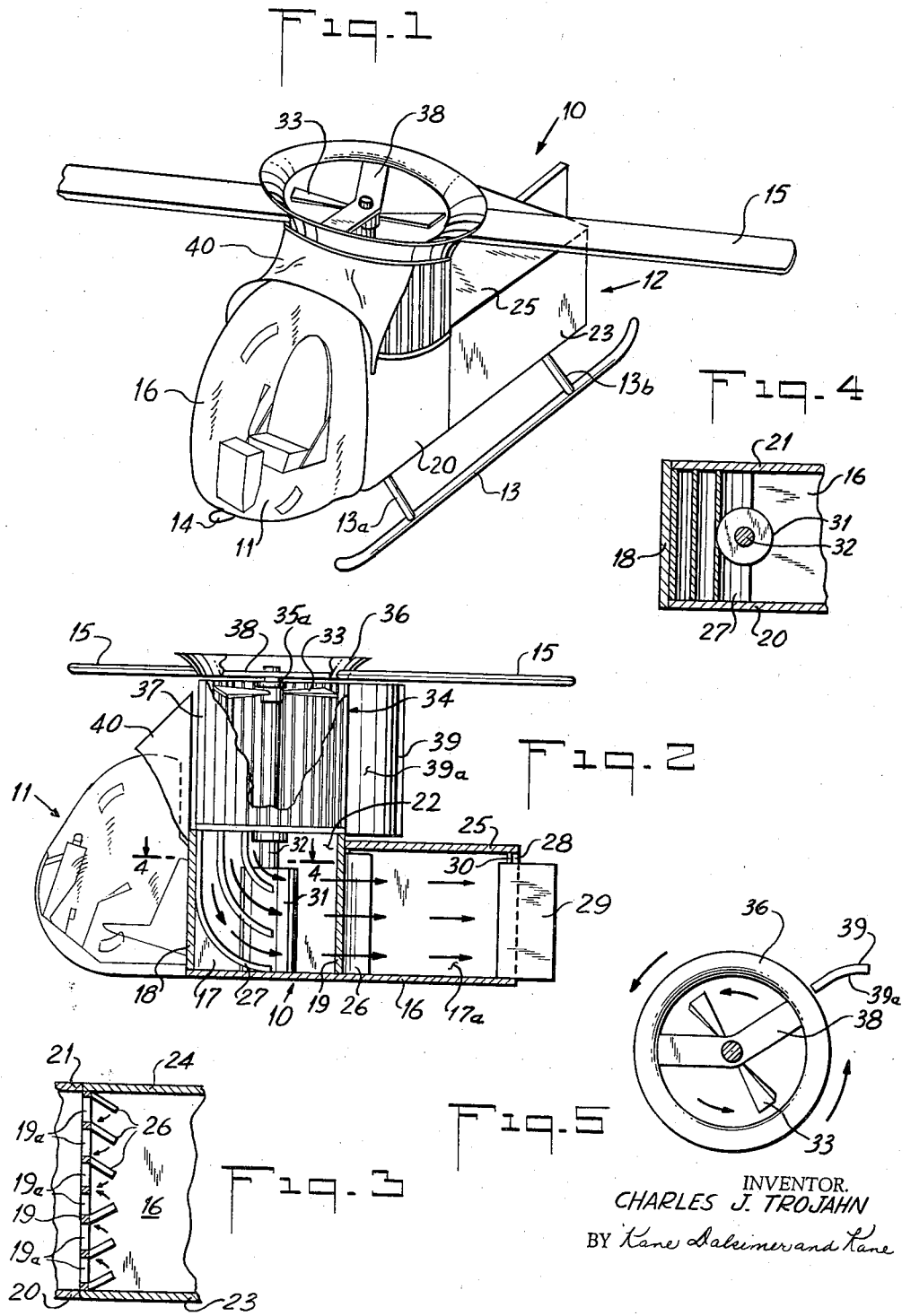
INVENTOR.
CHARLES J. TROJAHN
BY Kane Dalsimer and Kane
ATTORNEYS Jan. 31, 1961  C. J. TROJAHN  2,969,937
AIRCRAFT ROTOR DRIVING MEANS
Filed Dec. 31, 1957  2 Sheets-Sheet 2

INVENTOR.
CHARLES J. TROJAHN
BY Kane, Dalimer and Kane

ATTORNEYS

United States Patent Office 2,969,937
Patented Jan. 31, 1961

2,969,937

AIRCRAFT ROTOR DRIVING MEANS

Charles J. Trojahn, Forest Hills, N.Y.
(61—02 84th St., Middle Village 79, N.Y.)

Filed Dec. 31, 1957, Ser. No. 706,427

14 Claims. (Cl. 244—17.19)

This invention relates generally to driving means and apparauts and more particularly to a driving means for use in an aircraft which is heavier than air.

In most present day aircraft the cost of the transmissions, clutches and various drives make the aircraft very complex and costly. The weight added by these various units brings the aircraft more quickly to the requirement of another predetermined hour-check on one of the units comprising a component of the aircraft. A new type drive for aircraft is described in this application wherein, if used, the only hour-check needed would take place at the prime source of power, which can be internal combustion, gas turbine or one of the other suitable types, and at a few bearings that hold portions of the drive in position.

The aircraft driving means, which is the subject of this invention, is described in connection with a rotary winged craft, specifically a helicopter, which is a heavier than air flying machine whose chief support in flight is derived from the reaction of the air upon a system of power driven revolving planes. The helicopter has been selected for descriptive purposes only, and the aircraft driving means described herein can be used in a rotaplane which is a heavier than air aircraft which derives its lift or support from the aerodynamical reaction of freely rotary blades which have axes substantially vertical, or it can also be utilized in connection with fixed wing craft as well.

The invention herein disclosed has as its principal object the furnishing of a new aircraft driving means which allows for use of a simple transmission thereby eliminating the usual drives, clutches and other cumbersome components commonly associated with present day heavier than air aircraft.

Another object of this invention is to provide an aircraft driving means which allows a heavier than air aircraft to be built at a low initial cost and have low operating costs.

A further object of this invention is to provide an aircraft driving means which will enable an aircraft to leave the ground as a full helicopter and after take-off, be converted to a rotary wing plane or a fixed wing machine.

A further object of this invention is the provision of an aircraft driving means which when utilized in a rotary winged craft greatly reduces the amount of undesirable torque which is normally set up by large diameter rotor blades which are commonly used and thereby eliminates the necessity for an auxiliary torque-compensating unit.

The aircraft driving means, which is the subject of this invention, builds up about a heavier than air aircraft a high-pressure layer of air directly beneath the rotor blades thereby enabling the rotor blades to be greatly decreased in diameter and allow the aircraft to reach a higher forward speed.

An aircraft driving means, embodying the invention, and the manner of using the same described herein are primarily adapted to use in a helicopter, with reference to the drawings in which:

Fig. 1 is a perspective view of an aircraft equipped with the driving means which is the subject of this invention;

Fig. 2 is a partially cutaway side elevational view of the aircraft shown in Fig. 1;

Fig. 3 is a segmentary view from above of the damper doors which are used in connection with the aircraft driving means in the aircraft shown in Fig. 1;

Fig. 4 is a partially sectional view taken along the line 4—4 in the direction of the arrows as indicated in Fig. 2 showing the air control fins of the aircraft driving means;

Fig. 5 is a segmentary view from above of the air wheel which is utilized in the aircraft driving means used in the aircraft shown in Fig. 1;

Figure 6:
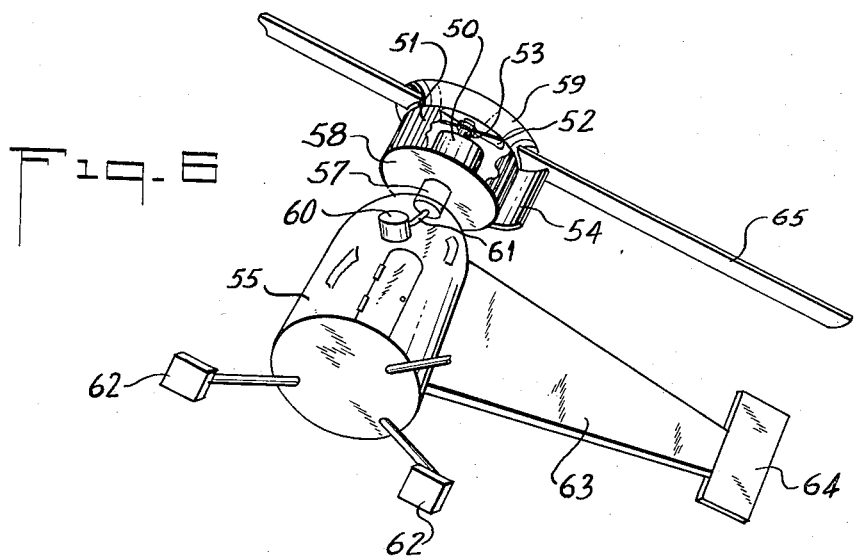
Fig. 6 is a perspective view of a very light, one-man aircraft equipped with the driving means which is the subject of this invention.

A heavier than air aircraft of the rotary winged type is shown in Fig. 1, and designated generally by the numeral 10. Craft 10 consists essentially of conventional cyclic and collective controls, designated generally in Figs. 1 and 2 by the numeral 11, fuselage body 12, landing gear 13 and 14, and rotor blades 15.

Controls 11 can be enclosed or open. It is preferred that they be enclosed by a plastic or glass shell which is transparent so that an operator disposed within can have broad vision. Such a shell is shown and is designated by the numeral 16. The landing gear consists of stationary members 13 and 14. Landing gear 13 is shown attached to fuselage 12 by means of rigid shafts 13a and 13b, and landing gear 14 is likewise attached.

The fuselage as seen in Fig. 2 is constructed from any suitable strong light weight metal which is commonly used to form fuselages for heavier than air aircraft. Fuselage 12 consists of base member 16 which serves as a base for chamber 17 and duct 17a. Chamber 17 is formed by base 16 and sides 18, 19, 20 and 21 which extend perpendicularly upward from base 16 to form the chamber which has an opening at its top designated in the drawing by the numeral 22. Vertical openings or slots are provided in member 19 and designated by the numerals 19a which form openings to duct 17a which is defined by member 19, base 16, sides 23 and 24 and top 25.

Vertically extending damper doors 26 are pivotally connected to the fuselage so as to provide damper actions with the slots 19a, thus enabling an operator to isolate completely the passage from chamber 17 to duct 17a. Air control fins 27 are provided in chamber 17 so that air entering opening 22 of chamber 17 can be directed toward the openings 19a in member 19 where by the use of the damper doors, the air will be directed through duct 17a and out opening 28 at the rear of the fuselage, where rudder 29 is pivotally connected.

Rudder 29 may be a rectangular rigid member vertically mounted at opening 28 by means of shaft 30 which extends perpendicularly from base 16 and which has its uppermost end attached to member 25. This rudder, as will be explained below, operates as a directional control device since it can effect the direction of air flowing from opening 22 through the fuselage and out opening 28.

Air control fins 27 also serve to direct the air around engine 31 which is mounted in chamber 17 and thereby prevent an air bind which is a jamming or bunching up of air at a restriction causing uneven or distorted air flow.

Engine 31 is a gas turbine, internal combustion engine or any other suitable engine and is located in a vertical position within chamber 17 having its lower portion fastened to base 16. Motor shaft 32 extends vertically from motor 31 and delivers engine power to propeller 33 which is fastened thereto.

Air wheel 34 is rotatably connected with shaft 32 by means of bearings 35a which enable the air wheel to be positioned concentric with shaft 32 so that there will be no relative vertical motion between blades 15 and the air wheel, and yet the air wheel can rotate about shaft 32 independently. The air wheel is of the squirrel cage type having a hub 36 and vertically disposed blades 37 extending circumferentially about the periphery of the air wheel so that the blades as a group are concentric with shaft 32. The blades of the air wheel are maintained in position by means of spokes 38 which connect the hub of the air wheel to bearings 35a.

Rotor blades 15 are rigidly connected to hub 36 of the air wheel so that they turn with it. A controllable anti-torque deflector or a torque compensator 39 is pivotally connected to fuselage 12 directly in back of the air wheel as shown in Fig. 2.

The torque compensator is a curved member having a vertical cross section and its use will be explained below. Suffice it to state here that the torque compensator is pivotally mounted to the fuselage and is capable of being controlled and linked to move with rudder 29 from the same control in the control group 11.

Shield 40 which is mounted to the fuselage in front of air wheel 34 is of any suitable configuration which will enable it to prevent the flow of air from the air wheel from hitting on-rushing air derived from the forward movement of the aircraft.

The operation of the device shown in Figs. 1 to 5 will now be explained. (If the device is operating as a helicopter, propeller 33 is rotated by means of engine 31 at the instance of controls 11 at a fixed speed.) On take-off, damper doors 26 close openings 19a in member 19 thereby preventing passage of any air between chamber 17 and duct 17a. Engine 31 is brought up to take-off speed with rotor blades 15 at zero pitch. Propeller 33 which is directly connected to engine 31 by means of shaft 32, upon rotating, brings in air through the top of the air wheel which serves as an air entrance and drives this air down into chamber 17. Since openings 19a have been closed by damper doors 26, chamber 17 has a single opening 22 at the top thereof. Therefore, the air being drawn in through the top of the air wheel by means of propellers 33 will be forced against the blades of air wheel 34. The air will be expelled past the blades of the air wheel causing the air wheel to rotate, and causing rotor blades 15 to rotate therewith, thereby transmitting full power to the rotor blades. A controlled amount of pitch is conveyed by the operator to rotor blades 15 and the machine tends to rise vertically. If the device is operating as a helicopter, propeller 33 is rotated by means of engine 31 at a fixed speed.

Torque compensator 39 diverts the spent air that is expelled in its direction from the air wheel. This torque compensator which is capable of being controlled and linked to move with the rudder 29 from the same control in the cockpit has air driven through the air wheel directed against its curved surface 39a, and the result is that the torque set up by propeller 33 can be cancelled.

The action of the torque compensator is seen in Fig. 5. As propeller 33 rotates in a counter-clockwise direction, a clockwise torque is established tending to rotate the machine in a clockwise direction. As the air is driven past the blades of the air wheel it is directed against torque compensator 39 and the result is that the torque set up by propeller 33 is cancelled. This same exhausted air creates the pressure area under rotor blades 15 thus enabling the air brought down by rotor blades 15, as they rotate, to be placed upon a high-pressure area. This increases its lifting ability and at the same time makes it possible to use a smaller diameter rotor blade.

When the machine is brought up to sufficient height and speed, dampers 26 are opened slowly to permit the continual rush of air which heretofore had been through the air wheel blades, to be ducted through duct 17a and allow the machine to reach a higher speed. As the machine moves faster, the collective pitch on the rotor blades can be decreased to almost zero, and the machine flies as an autogyro. Rudder stabilizer 29 which is controlled in conjunction with the torque deflector is used for directional control. Side and rear movements are controlled by the cyclic stick when the ship is flying as a helicopter.

If the ship is operated as an autogyro or fixed wing craft, the air does not attempt to escape through the vanes of the air wheel. The air will tend to seek the path of least resistance and flow out of duct 17a and in so doing, give the ship a forward movement by its thrust.

In an auto-rotative landing, air wheel 34 would force air out past its blades due to centrifugal force. This air being placed directly beneath the rotor blades would produce a high-pressure area enabling a slower rate of descent in a power-off landing.

Figure 7:
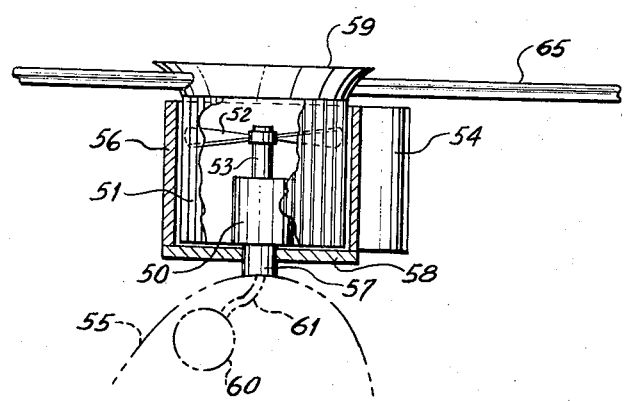
Fig. 7 is a partially cutaway side elevation view of the aircraft shown in Fig. 6.

Figs. 6 and 7 illustrate the aircraft driving means which is the subject of this invention incorporated in a single person, very light device. The engine 50 in this embodiment is positioned directly inside air wheel 51. Propeller 52 is directly connected to engine 50 by shaft 53. Torque compensator 54 is controlled from within cockpit 55. Deflector 56 prevents exhaust air from the blades of the air wheel 51 from clashing with on-rushing air. It is noted that mounting the engine directly inside the air wheel allows for the use of a shorter motor shaft 53, reduced weight and simplified engine cooling. Bearing 57 is a large diameter bearing to which the engine 50 on one end and the fuselage on the other are connected. This bearing allows air wheel 51 to rotate freely on its axis. It is noted that engine 50 is mounted upon plate 58. Plate 58 also serves to prevent air drawn in through intake 59 by propeller 52 from passing out in any manner but through the air wheel blades.

Fuel tank 60 is attached to the cockpit and fuel line 61 passes from tank 60 through bearing 57 to the engine. All of the engine and blade controls pass through this bearing as well.

The remainder of the craft consists of landing members 62 which are conventional and fuselage 63 to which is attached at its end a fixed fin 64. Rotor blades 65 are attached to the air wheel as in the first embodiment.

The device shown in the second embodiment operates almost identically with the device shown in the first embodiment, except that there is no air exhaust through the fuselage and all air exhausted from the air wheel must pass through the area where the torque compensator is effective to control the direction of the flight of the plane. Upon take-off, propeller 52 draws air in through intake 59. The air is forced out against the blades of the air wheel which in turn rotates the rotor blades 65. Thus the rotor blades are rotating above a pressure layer of air and torque compensator 54 is used to direct the flight of the craft.

Thus it is seen that in both embodiments of this invention, a simple light weight safe aircraft is made available.

Thus, among others, the several objects in the invention as specifically aforenoted, are achieved. Obviously numerous changes in construction and re-arrangement of parts might be resorted to without departing from the spirit of the invention as defined by the claims.

I claim:

1. A heavier than air aircraft comprising in combination a hollow body having a substantially horizontal opening at the top thereof and a substantially vertical opening at an end thereof, a shaft extending from said body vertically upward through said horizontal opening, an air wheel mounted concentrically with said shaft for relative rotary motion therewith, a propeller disposed within said air wheel and rigidly connected to said shaft, rotor blades rigidly connected to said air wheel near the top thereof, means for rotating said shaft about its axis whereby the rotation of the propeller will draw air downward through the air wheel and into said body, means for controlling the volume of air flowing through said vertical opening, means for controlling the direction of air flowing through said vertical opening and means for directing the flow of air from said air wheel horizontally beneath said rotor blades.

2. A heavier than air aircraft comprising in combination a hollow chamber having a substantially horizontal opening at the top thereof and a substantially vertical opening at an end thereof, a shaft extending from said chamber vertically upward through said horizontal opening, an air wheel mounted concentrically with said shaft for relative rotary motion therewith, an air intake formed in said air wheel, a propeller disposed within said air wheel and rigidly connected to said shaft, rotor blades rigidly connected to said air wheel above the blades thereof, means for rotating said shaft whereby the rotation of said propeller can draw air through said air intake and into said chamber, means for controlling the volume of air flowing through said vertical opening, means for controlling the direction of air flowing through said vertical opening, and means for altering the direction of flow of air which has passed the blades of said air wheel.

3. A heavier than air aircraft in accordance with claim 2, in which the means for rotating the shaft about its axis consists of a prime source of power rigidly mounted within the hollow chamber.

4. A heavier than air aircraft in accordance with claim 2, in which the means for controlling the volume of air flowing through the vertical opening consists of a slotted member and damper doors disposed within the chamber between the openings therein.

5. A heavier than air aircraft in accordance with claim 2, in which the means for controlling the direction of air flowing through the vertical opening consists of a rectangular member pivotally mounted on a vertical axis at the vertical opening in the chamber.

6. A heavier than air aircraft in accordance with claim 2, in which the means for altering the direction of flow of air which has passed the blades of the air wheel consists of a pivoted member with a surface thereof disposed within a portion of the air flowing through the blades of the air wheel and a shield member preventing flow of air through the blades of the air wheel at an area in spaced relation with the pivoted member.

7. A heavier than air aircraft in accordance with claim 2, in which the means for altering the direction of flow of air which has passed the blades of the air wheel consists of a member with a concave surface disposed within a portion of the air which has passed the blades of the air wheel pivotally mounted on a vertical axis adjacent the air wheel.

8. A lift means for a heavier than air aircraft comprising in combination a chamber with an opening formed in the top thereof, an air wheel adjacent and above said opening, rotor blades rigidly connected to said air wheel above the blades thereof, an air intake formed in said air wheel, means for drawing air into said chamber through said air intake and means associated with said chamber for exhausting air therefrom.

9. A lift means for a heavier than air aircraft comprising in combination a body, a chamber with an opening formed in the top thereof formed in said body, an air wheel adjacent and above said opening, rotor blades rigidly connected to said air wheel above the blades thereof, an air intake formed in said air wheel, means for drawing air into said chamber through said air intake, rotary torque compensation means mounted on said body adjacent said blower wheel and means associated with said chamber for exhausting air therefrom.

10. A lift means for heavier than air aircraft in accordance with claim 9, in which the means for drawing air into the chamber through the air intake consists of a motor-driven propeller rotating on an axis concentric with the air wheel.

11. A lift means for a heavier than air aircraft in accordance with claim 9, in which the rotary torque compensation means consists of a rigid member with a surface thereof constructed and arranged to deflect a portion of the air flowing outwardly through the blades of the air wheel and means for changing the angle of deflection.

12. A lift means for a heavier than air aircraft in accordance with claim 9, in which the rotary torque compensation means consists of a pivoted member with a surface disposed within a portion of the air which has passed through the blades of the air wheel.

13. A lift means for a heavier than air aircraft in accordance with claim 9, in which the means for exhausting air from the chamber consists of an air damper and damper doors opening the chamber to the atmosphere.

14. A heavier than air aircraft comprising in combination a hollow body with a single horizontal opening at the top thereof and a single vertical opening at an end thereof, a circular shaft extending vertically upward with one end disposed within said chamber and its remaining end above said chamber, an air wheel mounted concentrically with said shaft for relative rotary motion therewith, said wheel in spaced relation with said shaft, a propeller rigidly connected to said shaft within said air wheel, rotor blades rigidly connected to said air wheel near the top thereof above said propeller, a motor within said body and attached to said shaft for rotating said shaft about its axis.

References Cited in the file of this patent

UNITED STATES PATENTS

| | | |
|---|---|---|
| 1,585,281 | Craddock | May 18, 1926 |
| 1,820,919 | Massy | Sept. 1, 1931 |
| 1,925,156 | Vaughn | Sept. 5, 1933 |
| 2,461,435 | Neumann | Feb. 8, 1949 |
| 2,728,537 | Elkins | Dec. 27, 1955 |